US012683961B2

(12) United States Patent
    Madishetti et al.

(10) Patent No.:    US 12,683,961 B2
(45) Date of Patent:        Jul. 14, 2026

(54) SYSTEM AND METHOD FOR CLOUD DESKTOP MANAGEMENT USING A SECURE CLOUD PROXY

(71) Applicant: Workspot, Inc., Campbell, CA (US)

(72) Inventors: Shiva Prasad Madishetti, Frisco, TX (US); Raminder S. Channe, San Jose, CA (US); Amitabh Bhuvangyan Sinha, San Jose, CA (US); Jimmy Chang, Mountain View, CA (US); Virabrahma Prasad Krothapalli, San Jose, CA (US); David T. Sulcer, Pacifica, CA (US)

(73) Assignee: Workspot, Inc., Campbell, CA (US)

( * ) Notice: Subject to any disclaimer, the term of this patent is extended or adjusted under 35 U.S.C. 154(b) by 217 days.

(21) Appl. No.: 18/503,598

(22) Filed: Nov. 7, 2023

(65) Prior Publication Data

US 2025/0030687 A1     Jan. 23, 2025

Related U.S. Application Data

(60) Provisional application No. 63/527,505, filed on Jul. 18, 2023.

(51) Int. Cl.
    H04L 9/40          (2022.01)
    G06F 9/455          (2018.01)
                (Continued)
(52) U.S. Cl.
    CPC ...... H04L 63/0884 (2013.01); G06F 9/45558 (2013.01); G06F 9/547 (2013.01); G06F 2009/45595 (2013.01)

(58) Field of Classification Search
    CPC ............. H04L 63/0884; H04L 63/0281; G06F 9/45558; G06F 9/547; G06F 2009/45595
                (Continued)

(56)             References Cited

U.S. PATENT DOCUMENTS

| 10,289,400 | B2 * | 5/2019 | De Zaeytijd .............. G06F 8/65 |
| 2011/0209064 | A1 * | 8/2011 | Jorgensen ............... G06F 9/455 |
| | | | 709/227 |

(Continued)

FOREIGN PATENT DOCUMENTS

| CN | 112769909 A | * | 5/2021 | ............. H04L 67/56 |
| CN | 113193990 A | * | 7/2021 | ........... H04L 41/069 |

*Primary Examiner* — Berhanu Shitayewoldetadik
(74) *Attorney, Agent, or Firm* — NIXON PEABODY LLP

(57)             ABSTRACT

A system and method for isolating security credentials from a desktop management system using security Cloud proxy to communicate with a Cloud service provider system. Application programming interface (API) credentials are stored in a credential store managed by a secure proxy service system protected by a security environment. The secure proxy service system is interposed between the Cloud provider system and the desktop management service system. An operational request from the desktop service system is received by the secure proxy service system. The desktop service system is in network communication with a user device accessing the Cloud provider system. An API credential is retrieved from the credential store to authorize the operational request. An API adaptor is activated to communicate with an application programming interface (API) of the Cloud provider system to allow the Cloud provider to perform operational request.

21 Claims, 7 Drawing Sheets

(51) Int. Cl.

| | | |
|---|---|---|
| *G06F 9/54* | (2006.01) | |
| *G06F 15/16* | (2006.01) | |
| *H04L 15/16* | (2006.01) | |
| *H04L 29/06* | (2006.01) | |
| *H04L 29/08* | (2006.01) | |

(58) Field of Classification Search

USPC ............................................................ 726/6

See application file for complete search history.

(56) References Cited

U.S. PATENT DOCUMENTS

| | | | |
|---|---|---|---|
| 2012/0084344 A1* | 4/2012 | Kalyanasundaram | ........................ H04W 92/24 709/203 |
| 2013/0132584 A1* | 5/2013 | Palladino | ................ G06F 9/541 709/226 |
| 2017/0364404 A1* | 12/2017 | Yang | ................... G06F 11/0751 |
| 2018/0041491 A1* | 2/2018 | Gupta | ..................... G06F 9/547 |
| 2018/0115551 A1* | 4/2018 | Cole | ................... H04L 41/0895 |
| 2019/0273683 A1* | 9/2019 | Jiang | ................... G06F 9/45558 |
| 2021/0218722 A1* | 7/2021 | Gaylor | ................. H04L 9/0894 |
| 2022/0174367 A1* | 6/2022 | Dorn | .................... G06F 3/0482 |
| 2022/0201092 A1* | 6/2022 | Kim | ........................ G06F 9/547 |
| 2022/0206908 A1* | 6/2022 | Brar | ................... G06F 11/2005 |
| 2022/0222363 A1* | 7/2022 | Rupawalla | ............. G06F 21/31 |

* cited by examiner

PRIOR ART - Cloud Desktop Service System (No Secure Cloud Proxy)

Cloud Desktop Service System (With Secure Cloud Proxy)

|  | Proxy API | Provider CloudPro API | Provider VirtualNet API |
|---|---|---|---|
| Name: | InstantiateDesktop() | CreateDisk(), CreateNetworkInterface Card(), CreateVMInstance() | ProvisionStorage(), ProvisionVirtualMachine() |
| Inputs: | Provider | n/a | n/a |
|  | Cloud Region | Cloud Region | Cloud Region |
|  | n/a | n/a | Availability Zone |
|  | n/a | n/a | Node Group Name |
|  | Machine Family | Machine Family | n/a |
|  | Machine series | n/a | Node Type |
|  | Machine Type | SKU | Machine Type |
| Outputs: | Operation Code | Return Code | Return Value |
|  | VM ID | InstanceID | VirtualMachineID |

SYSTEM AND METHOD FOR CLOUD DESKTOP MANAGEMENT USING A SECURE CLOUD PROXY

PRIORITY CLAIM

The present disclosure claims priority to and benefit of U.S. Provisional Application No. 63/527,505 filed on Jul. 18, 2023. The contents of that application are hereby incorporated by reference in their entirety.

TECHNICAL FIELD

The present disclosure relates generally to Cloud-based virtual application systems. More particularly, aspects of this disclosure relate to an independently managed security proxy for secure interface between a control plane and a Cloud provider to provide a virtual application to a client device.

BACKGROUND

Computing systems that rely on applications operated by numerous networked computers are ubiquitous. Information technology (IT) service providers thus must effectively manage and maintain very large-scale infrastructures. An example enterprise environment may have many thousands of devices and hundreds of installed software applications to support. The typical enterprise also uses many different types of central data processors, networking devices, operating systems, storage services, data backup solutions, cloud services, and other resources. These resources are often provided by means of cloud computing, which is the on-demand availability of computer system resources, such as data storage and computing power, over the public internet or other networks without direct active management by the user.

Users of networked computers such as in a cloud-based system may typically log into a computer workstation or client device and are provided a desktop application that displays an interface of applications and data available via the network or cloud. Such desktop applications will be initially accessed when a user logs in, but may remain active to respond to user operation of applications displayed on the desktop interface. While users may activate the desktop application on any computer on the network, most users work from one specific computer.

Cloud-based remote desktop virtualization solutions have been available for over a decade. These solutions provide virtual desktops to network users with access to public and/or private clouds. In cloud-based remote desktop virtualization offerings, there is typically a capability of associating a remote desktop virtualization template in a particular cloud region with a remote desktop virtualization pool in the same cloud region as part of the general configuration model. This remote desktop virtualization template is customized with the image of the right desktop for a particular remote desktop virtualization use case.

A cloud desktop service system provides cloud applications such as virtual desktops or other remote applications that are allocated from public or private cloud providers. In some cases, the cloud provider and cloud region are already selected. Users of cloud desktops access a computer desktop, or specific desktop application, using a local endpoint device. Each cloud desktop exists within a non-virtual computer known as a host. Some cloud providers may expose the existence of hosts and require that use of a host not be shared between multiple customers, for licensing or other reasons. For that or other reasons a cloud desktop service system may need to manage the allocation of virtual machines onto specific hosts.

A cloud desktop service system provisions and orchestrates the lifecycle of cloud desktops (including remote applications on shared server hosts) by communicating with cloud service providers (including both public and private clouds). For example, it may provision and manage desktops on behalf of customers using the services of a public cloud provider such as Microsoft Azure, Amazon AWS, Google GCP, or others, including a private cloud that includes virtual machines hosted by the customer itself. Thus, the desktop service system may be operated by one party who contracts with a Cloud provider that may be a second party.

The cloud desktop service system creates and manages other resources, possibly including virtual networks, virtual disks, gateway hosts, virtual machine templates, and others. Some virtual machines, such as gateway hosts, utility hosts (sometimes called "jump boxes") and cloud desktops themselves, are configured to run additional applications such as agents that can register resources with the cloud desktop service system, and send event information to allow the cloud desktop service system to monitor every aspect of the system use.

Typically in order to accomplish the monitoring of the system use, the cloud desktop service system uses the Application Programming Interface (API) that is published by the cloud provider, in order to access resources within the cloud provider's security environment. These APIs typically require the caller to have the appropriate access information. For example, one provider requires information about the service principal, the service accounts, and credentials to access these that might include names, passwords, and other secret information.

A typical known cloud desktop service system 10 where a desktop service system has access to such Cloud provider information is illustrated in FIG. 1. There are two separate security environments in the system 10, a cloud desktop service security environment 12 and a cloud provider security environment 14. The cloud desktop service security environment 12 is established and maintained by the cloud desktop service system itself and operated by a first party. The other cloud provider security environment 14 is established and maintained by the Cloud provider that supports virtual networks that are used to access the customer's data. The Cloud provider is often a second party that contracts with the first party to provide Cloud services to a customer.

The cloud provider security environment 14 protects a Cloud provider system that includes a gateway host 20, a managed cloud desktop virtual machine 22, a cloud provider API 24, and other resources 26. The Cloud desktop service security environment 12 protects a desktop service system that includes a desktop management service 30, a user/group manager 32, a monitoring service 34, and a secure confidential store 36.

A desktop client application 40 running on an endpoint device allows a user to access a virtual desktop that is managed by the desktop management service 30 and provided by the cloud provider. The desktop client application 40 accesses the cloud provider security environment 14 via a gateway 50. The virtual desktop is provided by the virtual machine 22. A gateway agent software application 52 monitors the operation of the gateway 50 and a gateway virtual machine software application 54 monitors the operation of the virtual machine 22. In this example, the agents 50 and 52 are in communication with the monitoring service 34 of the desktop management service 30. This allows the desktop management service 30 to monitor system use.

The desktop management service 30 orchestrates provisioning, power management (including the pause and resume of virtual machines), auto-scaling (including the management of pools of virtual machines, virtual disks, remote application hosts, and others), and possible other life cycle functions of cloud resources. Client applications, agents, and other elements communicate with the cloud desktop service system in the desktop service environment 12 to provide data to enable monitoring and orchestration capabilities. The desktop management service 30 has knowledge about each cloud provider API such as the API 24 in order to allow configuration of virtual resources managed by the Cloud provider system. Access information is stored in the secure confidential store 36 (such as a secure vault) that allows the desktop management service 30 to access secret information such as credential data, as required, to invoke the cloud provider API 24 in the security environment 14 of the Cloud provider.

The cloud provider API 24 provides a broad range of access to the Cloud subscription of a customer to the party operating the desktop service system. The broad range of access to the desktop service system is necessary to provide access to the Cloud provider system via the Cloud provider API 24 for purposes of managing virtual machines or related cloud infrastructure. For example, the Cloud provider API 24 could delete any number of virtual machines at any time, or provide access to any other party.

One problem with the approach in the system 10 in FIG. 1 that provides access to virtual desktops is that customers are required to trust the cloud desktop service system 30 with broad access that is provided by the Cloud provider API 24. This is generally more access than is needed in order to provide orchestration features of the cloud desktop service system. Another problem is that in order to support a new Cloud provider, the Cloud desktop service system itself must be updated with logic specific to the new Cloud provider API. This violates the well-known software design principle of encapsulation, in which independent development of each component is promoted in order to focus on a reduced set of concerns. As requirements change, it is desirable to avoid the need to modify more components of the system than is necessary, a well-known anti-pattern known as "tight coupling."

Thus, there is a need for a security system that allows credentials for a virtual desktop system to be inaccessible from a control plane. There is another need for an adaptable Cloud proxy that may interface with different Cloud APIs from different Cloud providers.

SUMMARY

One disclosed example is a system providing Cloud applications including a client application executed by a user device. The system includes a Cloud provider system providing network communication between the user device and a virtual machine executing a virtual application. The Cloud provider system includes a Cloud provider application programming interface (API). A desktop service system is in network communication with the user device and the Cloud provider system. A secure Cloud proxy service system is interposed between the Cloud provider API and the desktop service system. The secure Cloud proxy service system is protected by a security environment. The secure Cloud proxy service system includes a secure Cloud proxy service, a credential storage storing credentials for the Cloud provider API, and an API adaptor to communicate with the Cloud provider API. The secure Cloud proxy service controls communication between the desktop service system and the Cloud provider system.

In another implementation of the disclosed example system, the API adaptor is a plug-in customized by the owner of the secure Cloud proxy service system. In another implementation, the secure Cloud proxy service system includes a library of API adaptors specific to different Cloud provider systems, wherein the API adaptor is one of the API adaptors in the library. In another implementation, the secure Cloud proxy service system includes a proxy application programming interface (API) allowing control of operations of the desktop management service system in managing operations of the Cloud provider system. In another implementation, a proxy application programming interface operation is implemented by one of a single corresponding cloud provider operation, a sequence of intermediate cloud provider operations, or a batch of repeated cloud provider operations. In another implementation, the proxy application programming interface returns a partial status or an intermediate status while multiple intermediate cloud provider operations are occurring. In another implementation, the secure Cloud proxy service is operable to allow configurations of network paths to multiple instances of the Cloud proxy service for high availability. In another implementation, the credential store is one of a secure encrypted key vault, an encrypted file, a database, or a memory of the secure Cloud proxy service. In another implementation, a persistent connection is established between the secure Cloud proxy service and the desktop management service system. In another implementation, the secure Cloud proxy service controls operations of the desktop management service system associated with the virtual machine supported by the Cloud provider system. In another implementation, the secure Cloud proxy service only allows certain types of resources to be created by the desktop service system in the Cloud provider system.

Another disclosed example is a method for providing secure credentials for accessing a Cloud provider system that protects the secure credentials from a desktop management service system. Application programming interface (API) credentials are stored in a credential store managed by a secure proxy service system protected by a security environment. The secure proxy service system is interposed between the Cloud provider system and the desktop management service system. An operational request is received from the desktop service system. An API credential is retrieved from the credential store to authorize the operational request. An API adaptor communicating with an API of the Cloud provider system is activated to allow the Cloud provider to perform operational request.

In another implementation of the disclosed example method, the API adaptor is a plug-in customized by the owner of the secure Cloud proxy service system. In another implementation, the secure Cloud proxy service system includes a library of API adaptors specific to different Cloud provider systems, wherein the API adaptor is one of the API adaptors in the library. In another implementation, the example method includes allowing control of operations of the desktop management service system in managing operations of the Cloud provider system via a proxy application programming interface (API) of the secure Cloud proxy service system. In another implementation, the example method includes implementing a proxy application programming interface operation by one of a single corresponding cloud provider operation, a sequence of intermediate cloud provider operations, or a batch of repeated cloud provider operations. In another implementation, the proxy application programming interface returns a partial status or an intermediate status while multiple intermediate cloud provider operations are occurring. In another implementation, the secure Cloud proxy service system is operable to allow configurations of network paths to multiple instances of the Cloud proxy service for high availability. In another implementation, the credential store is one of a secure encrypted key vault, an encrypted file, a database, or a memory of the secure Cloud proxy service system. In another implementation, the example method includes establishing a persistent connection between the secure Cloud proxy service system and the desktop management service system. In another implementation, the secure Cloud proxy service system controls operations of the desktop management service system associated with the virtual machine supported by the Cloud provider system. In another implementation, the secure Cloud proxy service system only allows certain types of resources to be created by the desktop service system in the Cloud provider system.

Another disclosed example is a non-transitory computer-readable medium having machine-readable instructions stored thereon, which when executed by a processor, cause the processor to store application programming interface (API) credentials in a credential store managed by a secure proxy service system protected by a security environment and interposed between a Cloud provider system and a desktop management service system in network communication with a user device accessing the Cloud provider system. The instructions cause the processor to receive an operational request from the desktop service system. The instructions cause the processor to retrieve an API credential from the credential store to authorize the operational request. The instructions cause the processor to activate an API adaptor communicating with an API of the Cloud provider system to allow the Cloud provider to perform operational request.

The above summary is not intended to represent each embodiment or every aspect of the present disclosure. Rather, the foregoing summary merely provides an example of some of the novel aspects and features set forth herein. The above features and advantages, and other features and advantages of the present disclosure, will be readily apparent from the following detailed description of representative embodiments and modes for carrying out the present invention, when taken in connection with the accompanying drawings and the appended claims.

BRIEF DESCRIPTION OF THE DRAWINGS

The disclosure will be better understood from the following description of exemplary embodiments together with reference to the accompanying drawings, in which:

FIG. 3 is a table showing the different commands for provisioning a virtual desktop in the example Cloud desktop system in FIG. 2;

Figure 1:
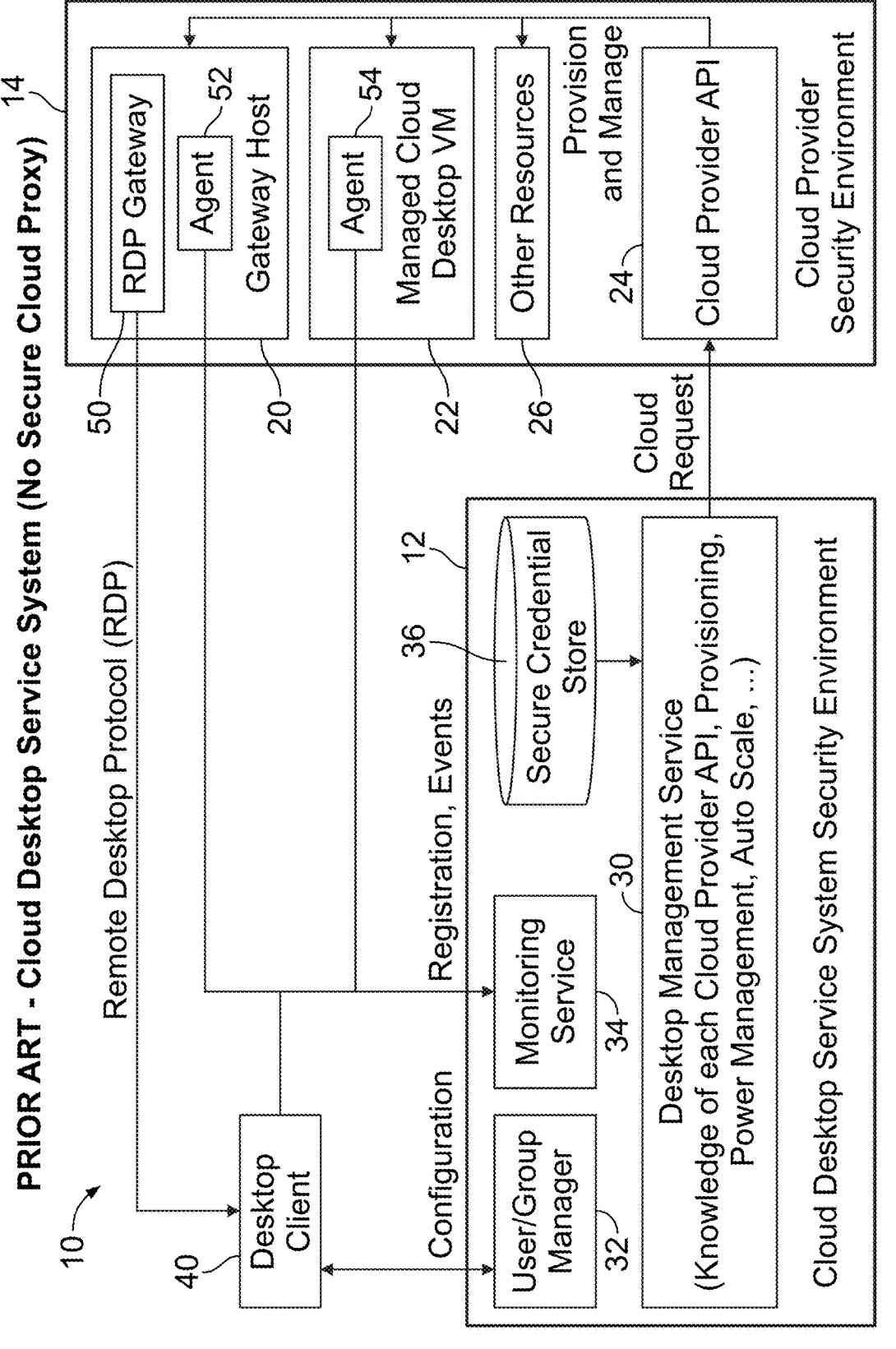
FIG. 1 is a diagram showing a prior art security procedure for Cloud based computing.

The present disclosure is susceptible to various modifications and alternative forms. Some representative embodiments have been shown by way of example in the drawings and will be described in detail herein. It should be understood, however, that the invention is not intended to be limited to the particular forms disclosed. Rather, the disclosure is to cover all modifications, equivalents, and alternatives falling within the spirit and scope of the invention as defined by the appended claims.

DETAILED DESCRIPTION OF THE ILLUSTRATED EMBODIMENTS

The present inventions can be embodied in many different forms. Representative embodiments are shown in the drawings, and will herein be described in detail. The present disclosure is an example or illustration of the principles of the present disclosure, and is not intended to limit the broad aspects of the disclosure to the embodiments illustrated. To that extent, elements and limitations that are disclosed, for example, in the Abstract, Summary, and Detailed Description sections, but not explicitly set forth in the claims, should not be incorporated into the claims, singly or collectively, by implication, inference, or otherwise. For purposes of the present detailed description, unless specifically disclaimed, the singular includes the plural and vice versa; and the word "including" means "including without limitation." Moreover, words of approximation, such as "about," "almost," "substantially," "approximately," and the like, can be used herein to mean "at," "near," or "nearly at," or "within 3-5% of," or "within acceptable manufacturing tolerances," or any logical combination thereof, for example.

The present disclosure relates to a method and system to provide an intermediate service that can be termed a secure Cloud proxy service for security between the security environment of a Cloud provider and the security environment of a virtual desktop service provider. The secure Cloud proxy service is a system that is controlled by a customer of the Cloud provider that includes a credential storage. The Cloud proxy service is interposed between the Cloud API of the Cloud provider system and the desktop service provider system. In this manner, the desktop service provider does not have access to the security credentials to access the Cloud provider system but may still perform operations in relation to the Cloud provider system for managing the provisioning of and access to virtual applications such as virtual desktops for an endpoint device.

Figure 2:
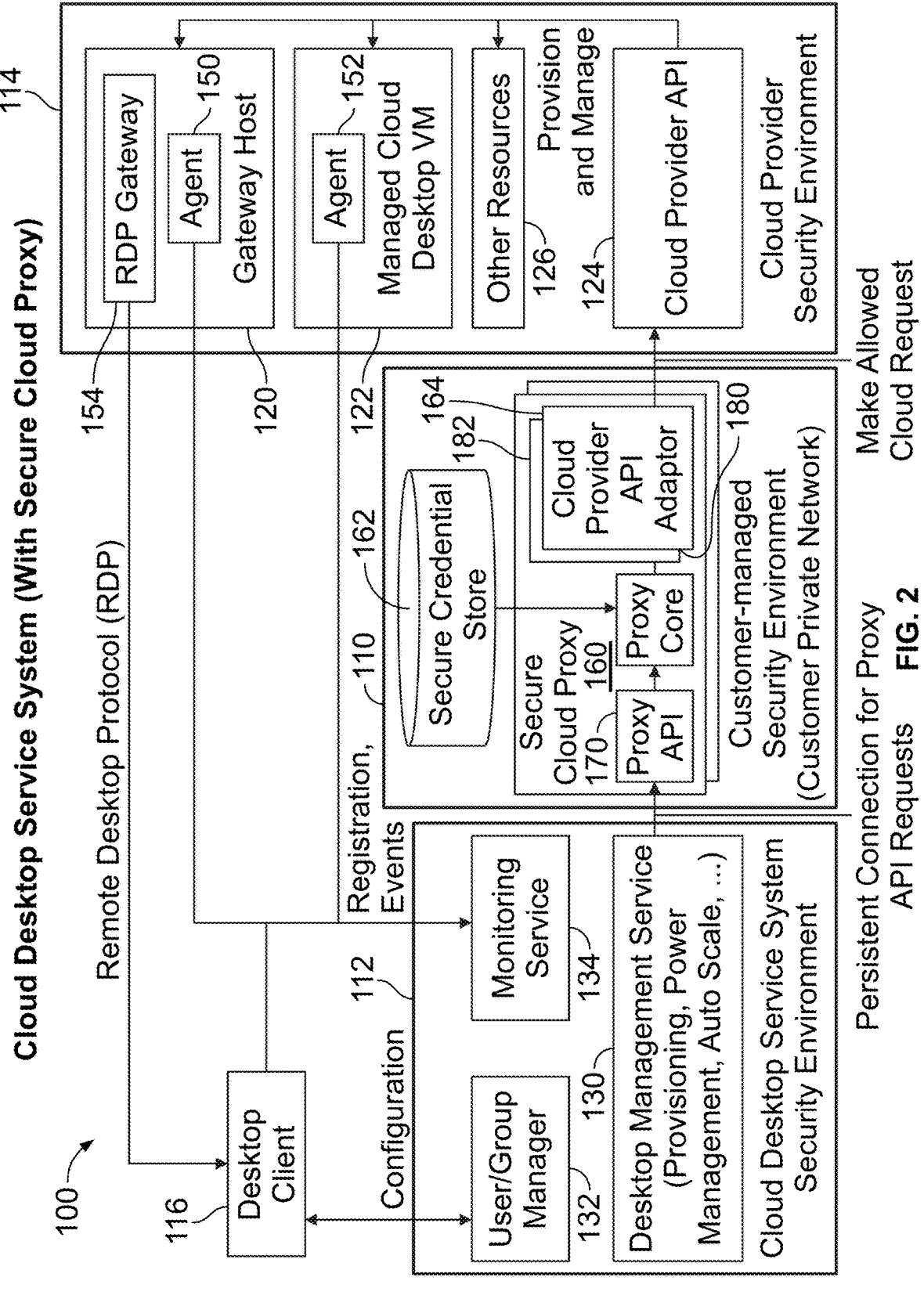
FIG. 2 is a block diagram of an example Cloud proxy based security system in a Cloud desktop system.

FIG. 2 shows a virtual Cloud based computing system 100. The computing system 100 includes an example secure Cloud proxy service system 110, a Cloud desktop service system 112, and a Cloud provider system 114. The cloud desktop service system 112 is supervised by a first party and has its own security environment. The cloud provider system 114 has its own security environment maintained by a second party to support virtual networks that are used to access the customer's data. A customer of the party operating the desktop service system 112 and the Cloud provider operating the Cloud provider system 114 may have users that access remote virtual applications such as virtual desktops. A client application such as a desktop client 116 operates on a client or endpoint device. Users that may be employed by or associated with a customer may access virtual applications, including virtual desktops, through the desktop client application 116.

Thus, users access a virtual desktop orchestrated by the Cloud desktop service system 112 that works in conjunction with the Cloud provider system 114 in this example. Client devices may be any device having computing and network functionality, such as a laptop computer, desktop computer, smartphone, or tablet. Client devices execute the desktop client 116 to access remote applications such as the desktop. The desktop client application 116 authenticates user access to the applications provided by the Cloud desktop service system 112 in conjunction with the Cloud provider system 114. A client device can be a conventional computer system executing, for example, a Microsoft™ Windows™-compatible operating system (OS), Apple™ OS X, and/or a Linux distribution. A client device can also be a client device having computer functionality, such as a personal digital assistant (PDA), mobile telephone, tablet, video game system, etc.

The Cloud provider system 114 includes a gateway host 120, a managed cloud desktop virtual machine 122, a cloud provider API 124, and other resources 126. The Cloud desktop service system 112 includes a desktop management service 130, a user/group manager 132, and a monitoring service 134. A customer of the Cloud provider system 114 relies on the Cloud provider system 114 to provide virtual machine resources for executing applications such as a virtual desktop that are managed by the desktop service system 112.

Common global pools of Cloud desktops may be available to serve the users, whereby each global pool is based on a common desktop template. There can be multiple global pools based on which groups users belong to and their job requirements. For example, the desktop service system 112 may manage different pools for a customer such as a developer desktop pool, an engineering workstation pool, or a call center application pool. The Cloud desktops each include configuration and definitions of resources necessary to offer the Cloud desktop to the end point device running the client application 116. There can be multiple logical pools based on which groups users belong to and their job requirements. The Cloud desktops each include configuration and definitions of resources necessary to offer the cloud desktop. The Cloud desktops in a particular pool may each be supported by different cloud providers based on the requirement of the desktop pool.

For example, pools such as the developer desktop pool or the engineering workstation pool allow users in the pool a cloud desktop that allows access to graphic processing unit (GPU) based applications. Other example applications may include those applications used for the business of the enterprise, for example, ERP (enterprise resource planning) applications or CRM (customer relationship management) applications. These applications allow users to control the inventory of the business, sales, workflow, shipping, payment, product planning, cost analysis, interactions with customers, and so on. Applications associated with an enterprise may include productivity applications, for example, word processing applications, search applications, document viewers, and collaboration applications. Applications associated with an enterprise may also include applications that allow communication between people, for example, email, messaging, web meetings, and so on.

Definitions and configurations for infrastructure and desktop service resources, including gateways, desktop templates, and others that are applied to cloud regions are managed by the Cloud desktop service system 112. The Cloud provider system 114 implements the resources, including virtual cloud Desktops, infrastructure, and other virtual resources, all of which are virtual machines or other virtual resources hosted in a public or private Cloud.

The Cloud desktop service system 112 may include a desktop service control plane that includes the desktop management service 130, the user/group manager 132, and the monitoring service 134. The service control plane can manage the entire lifecycle of a Cloud desktop service implementation, from creating and managing the required Cloud desktops, to monitoring and analyzing the stream of operational data collected, enforcing security policies, and optimizing the experience for IT administrators and Cloud desktop users. For example, the desktop service control plane may register a set of a virtual networks, virtual storage resources, and more. Within a virtual network, the control plane may further register and coordinate the use of gateways, enterprise connectors, desktop templates, connection brokers, and more.

The desktop client application 116 running on a client device allows a user to access a virtual desktop that is managed by the desktop management service 130 of the desktop service system 112, and provided by virtual machines running on the cloud provider system 114. As explained above, the example desktop client 116 is software executed by device hardware available in the local environment of a desktop user to remotely access a managed Cloud desktop using a remote desktop protocol. The desktop client 116 communicates with the desktop service control plane of the desktop service system 112 to monitor latency, response-time, and other metrics to measure quality of user experience and also supports a remote display protocol in order for users to connect to a Cloud desktop application run by the Cloud provider system 114.

The desktop client application 116 accesses the cloud provider system 114 via a gateway 150. The virtual Cloud desktop application is provided by the virtual machine 122. A gateway agent software application 152 monitors the operation of the gateway 150 by the gateway host 120 and a gateway virtual machine agent software application 154 monitors the operation of the virtual machine 122. In this example, the agents 152 and 154 are in communication with the monitoring service 134 of the desktop service system 112. The gateway 150 may be present to provide secure public or internal limited access to the managed Cloud desktops, that may be deployed on a virtual machine of its own. The gateway agent software application 152 may be deployed on that gateway virtual machine by the desktop service control plane of the desktop service system 112. The gateway agent 152 enables the desktop service control plane to assist in configuration and operations management of the gateway 150.

Cloud provider systems such as the Cloud provider system 114 include a cluster of host servers that host the various applications as well as appropriate storage capabilities, such as virtual disks, memory, and network devices. Thus, the Cloud provider system 114 typically comprises IT infrastructure that is managed by IT personnel. The IT infrastructure may include servers, network infrastructure, memory devices, software including operating systems, and so on. If there is an issue related to an application reported by a user, the IT personnel can check the health of the infrastructure used by the application. The Cloud provider system 114 may include a firewall to control access to the applications hosted by the Cloud provider system 114 as part of the security environment. The firewall enables computing devices behind the firewall to access the applications hosted by the Cloud provider system 114, but prevents computing devices outside the firewall from directly accessing the applications.

The firewall may allow devices outside the firewall to access the applications within the firewall using a virtual private network (VPN).

The monitoring service 134 of the desktop service system 112 makes both routine and error events available to administrators and can analyze operational performance and reliability. The monitoring service 134 interacts with components in the system 100 including the desktop client application 116, gateway agent 152, and virtual machine agent 154, to obtain operational data relating to the desktop, and operational data generated by the control plane itself. The monitoring service 134 may store all such operational data for later analysis.

The desktop management service 130 interacts with the one or more managed virtual machines (MVMs) such as the virtual machine 122 in the Cloud provider system 114. In this example, the desktop management service 130 manages resources for providing instantiated Cloud desktops to the users in the logical pools, orchestrating the lifecycle of a logical desktop.

The Cloud service provider operational application programming interface (API) 124 presents services provided by the Cloud service provider that also participate in the management of the virtual machine. This can be utilized by the desktop service control plane of the desktop service system 112 to perform operations like provisioning or de-provisioning the virtual machine.

In this example, the example secure Cloud proxy service system 110 may be managed by the customer to store and therefore secure confidential data to allow the users associated with the customer to securely access the Cloud provider system 114. The secure Cloud proxy service system 110 includes a secure Cloud proxy service 160, a credential store 162 and an API adaptor 164. In this example the secure proxy service 160 may be a software application running on a server (proxy core) under the control of the customer and within a separate security environment. The use of the secure Cloud proxy service system 110 eliminates the need of the Cloud desktop service system 112 to access credentials or other information for accessing the Cloud provider API 124. Instead, the secure Cloud proxy service system 110 retains authorized access to the credentials that allow a user to directly access the Cloud provider API 124 and authorize operations performed by the Cloud desktop service system 112. The API adaptor 164 may be a module running within the secure Cloud proxy service 160 or an external module within the same security environment.

The secure Cloud proxy service system 110 runs within a customer-managed security environment that is insulated from the Cloud desktop service system 112. Typically, the security environment is a private network to ensure security from external devices. This security environment may be hosted and managed by the customer of the cloud provider 114, and not by the cloud desktop service system 112. The secure Cloud proxy service 160 thus has access to a secure credential store such as the credential store 162. The credential store 162 may be a secure encrypted key vault within the private network under the control of the customer. Alternatively, the credential store 162 may be in other forms, including: a file, possibly encrypted; a database; or even just in the working memory of the Secure Cloud Proxy service. Typically, the key vault is a Cloud service for securely storing and accessing secrets. A secret is anything that a user would want to tightly control access to, such as API keys, passwords, certificates, or cryptographic keys. The implementation of such a key vault is opaque to the services using the key vault.

The credential store 162 includes Cloud provider API credentials that allow access to the API 124. The Cloud desktop service system 112 thus does not have access to such credentials because the credential store 162 is in a separate security environment and is not on the Cloud desktop service system 112. The credential store 162 is therefore inaccessible to the party operating the Cloud desktop service system 112, unlike the prior art system in FIG. 1.

The secure Cloud proxy service system 110 initiates communication with the desktop service system 112 by authenticating itself with the Cloud desktop service system security environment thus protecting the Cloud provider system 114. For example, the secure Cloud proxy service system 110 may initiate the process by establishing a TCP/IP socket connection that is used to wait for (solicit) input from the desktop service system 112. This means that the cloud desktop service system 112 does not require access credentials to the customer-managed security environment.

The secure Cloud proxy service system 110 supports a proxy API 170 that may be provided via the desktop service system 112 for communication between the secure Cloud proxy service system 110 and the desktop service system 112. The proxy API 170 allows the Cloud desktop service system 112 to request operations be performed by the Cloud provider 114. For example, the proxy API 170 supported by the secure Cloud proxy service system 110 may only provide a subset of the types of operations available via direct access of the Cloud Provider API 124, and may provide more control over who can perform operations and when these operations can occur. As an example, the secure Cloud proxy service 160 may enforce additional security policies, such as to only allow deletion of virtual machines that were created by the secure Cloud proxy service 160, or to only allow certain types of resources to be created by the desktop service system 112 for the Cloud provider 114.

Typically, the standard proxy implementation will include a library of adaptors 180 for various well-known cloud provider APIs. The library of adaptors 180 includes adaptors 182 that are designed for different cloud provider APIs. The adaptors 182 include the adaptor 164 which is loaded from the library of adaptors 180 for the particular Cloud provider such as the provider of the Cloud provider system 114 in this example. This allows a single, abstract proxy API such as the proxy API 170 to be used by the desktop service system 112 so that the desktop service system 112 no longer requires details about each cloud provider API such as the Cloud provider API 124 or other APIs corresponding with adaptors 182 in the library 180.

The operation of the adaptor 164 is to transform a request supported by the proxy API 170 into equivalent request or requests supported by a particular cloud provider API 124. FIG. 3 is a table 300 that shows an example proxy API operation in a column 310 to create a new virtual machine using an abstracted API such as the proxy API 170, and includes the equivalent operations of different Cloud APIs supported by two example cloud providers, "CloudPro" and "VirtualNet" represented by columns 312 and 314. The adaptor 164 contains logic operable to map an incoming request from the proxy API 170.

The rows of the table 300 are grouped into input parameters 320 and output parameters 322. In this example, the input parameters 320 include a row 330 shows a request titled "InstantiateVM( )" that is mapped into one or more cloud provider API equivalents. In this example in the row 330, the request "InstantiateVM( )" is mapped into exactly one request supported by the required Cloud provider API. Input parameters 320 illustrate information that is to be passed from the invoking desktop service 112 to the cloud provider API 124 via the proxy API 310. Output parameters 322 illustrate information that is to be returned to the invoking desktop service 112 upon completion of the request, via the proxy API 310.

In some implementations, the Cloud Proxy service system such as the system 110 determines which Cloud provider to use based on internal logic in the Cloud proxy service system. In this example, the abstract API for 'InstantiateDesktop( ))' includes a parameter for a "Provider," shown in the row 330. In this example, the Provider parameter may have the value of a Cloud provider name such as "CloudPro" or "VirtualNet." The Provider parameter directs the Cloud proxy 160 to one of the provided adaptors, which then ignore the value of the "Provider" parameter.

This example also illustrates that the information required by the selected cloud provider API may vary according to the Cloud provider and the parameters required. Some parameters of the proxy API may be needed for all cloud provider APIs. In this example, these include the "Cloud Region" (which data center to use) in row 332, and 'Machine Type' (what specific type of machine hardware is emulated) in row 342. However, the names of these parameters may be different according to the cloud provider API, for example, the parameter "Machine Type" in row 342 has a different parameter name for the other Cloud provider, "CloudPro" as it called "SKU," but serves an equivalent function, and the adaptor logic is capable to map the parameter accordingly.

The example table 300 also illustrates that a single operational request, such as "InstantiateDesktop( )", may be mapped to a routine in the adaptor that in turns invokes a sequence of Cloud provider API calls. In this example, instantiating a desktop requires three distinct cloud provider calls the for CloudPro: provider CreateDisk( ), followed by CreateNetworkInterfaceCard( ), followed by CreateVMInstance( ). The Cloud provider API calls in column 312 will use the parameters indicated within the column 312 in rows where the value is not "n/a" (not applicable) as required by the cloud provider API. Because all three of these operations are required to instantiate a cloud desktop, they are combined into a single request in the proxy API 170, but are individually carried out by the adaptor for the Cloud provider CloudPro. In this example, the proxy simplifies the interaction with the Cloud provider by providing an additional level of abstraction. In this example, the API adaptor of the Cloud provider VirtualNet accomplishes the same functionality with two cloud provider API calls: ProvisionStorage( ), followed by Provision VirtualMachine( ). Thus, in either case, the implementation of the adaptor is coded to invoke a single or multiple API calls.

Although not illustrated in FIG. 3, it is also possible that the proxy API may bundle a batch, or group of similar operations into a single invocation. For example, the proxy API call could include a InstantiateMultipleDesktops( ) that instantiates a multiplicity of similar desktops, and the adaptor implementation would be responsible to repeat operational calls as needed to achieve the desired result.

Although not illustrated in FIG. 3, it is also possible that the proxy can have a special operational APIs to manage bulk operations because they may take some time to complete. For example, there could be a mechanism to return partial status or progress information to the desktop management system. The status or progress information may be used to allow the desktop management system to monitor, handle errors, or assist in trouble-shooting problems. For example, if 100 desktops are being instantiated and an error occurs after the tenth desktop is successfully created, such operational APIs could allow the desktop management system to retry or cancel the remaining operations.

The example table 300 also illustrates that there may be parameters that are determined by the adaptor 164 and are not provided by the proxy API 170. For example, the adaptor for the "VirtualNet" Cloud provider must provide values for "Availability Zone" (selecting a data center in the same geographical region) in row 334 and "Node Group Name" (which cluster of hosts should be used by the cloud provider) in row 336 because these parameters may be specifically required only for the Cloud API of the "VirtualNet" Cloud provider. In this case the adaptor 164 must have sufficient logic or configuration settings to provide the values of these parameters.

The example table 300 also illustrates that the example proxy API 170 may support parameters that are only used by some and not all adaptors. These parameters may be optional for the Proxy API 170 or may be required, so that the Desktop Management Service invoking the Proxy API 170 need not understand the requirements of each adaptor to simplify its own implementation. For example, the "VirtualNet" Cloud provider adaptor does not require the "Machine Family" (general class of virtual machine) parameter in row 338 so the adaptor ignores the value for this parameter provided by the proxy API 170, regardless of whether or not the parameter is required by the proxy API 170. Similarly, the "Machine Type" parameter in row 342 is ignored by the adaptor for the CloudPro Cloud provider but is required for the VirtualNet Cloud provider.

In this example in the output parameters 322, the Proxy API expects two output parameters to have values provided by the Cloud provider back to the desktop service system 112. The first example parameter is an "Operation Code" indicating success or failure of the request. The second example parameter is "VM ID" indicating the unique identifier for the virtual machine instantiated by the request, which may be used in subsequent operational requests regarding the new virtual machine. In both of these examples, the output parameter values 322 are mapped back from specific implementations in various APIs for the Cloud providers, such as the CloudPro cloud provider and the VitualNet Cloud provider, into the abstracted proxy API 310 in similar manner to the mapping of input parameter values.

In some implementations, the proxy API 170 may expose more details of specific adaptors, and in the extreme case may include a variant for each cloud provider API and not attempt to abstract the cloud provider API 124 at all, in which case the caller of the proxy API 170 must be aware of all the requirements of each cloud provider API.

The implementation of each adaptor may be provided as part of the Cloud desktop service system 112, which also provides the Cloud proxy service 160 software itself. In this case, the development, deployment, and operation of the adaptors is completely the responsibility of organization providing the Cloud desktop service system 112, even though the adaptors are executed and run within the security environment of the private network of the Cloud proxy service system 110 controlled by the customer.

The Cloud proxy service 160 may be deployed by a customer along with transparent source code so that that the customer has complete knowledge about, and responsibility for, the behavior of the proxy. The proxy may even be provided solely as source code that the customer can chose to compile and deploy itself.

Alternatively, the Cloud proxy service 160 may be extensible, by supporting a plug-in model for the customer to provide their own custom source code for an adaptor. This may be useful in allowing rapid support for the emergence of a new, and possibly highly specialized Cloud provider. This approach is sometimes known as an API framework. For example, documentation may be provided about the internal API specification for each operation supported, and some mechanism is provided for the secure Cloud proxy to dynamically discover and load such custom adaptor implementations, and possibly to invoke automated testing of them. In comparison with adaptor implementations provided by the Cloud Desktop Service System, the significant difference may only be in the extent of documentation, testing tools, and technical support provided to create and deploy a custom adaptor.

The customer may deploy proxies using standard techniques to ensure high availability and scalability for performance, such as running multiple instances in a cluster in the same cloud region based on the load, and/or instances in multiple regions, to implement failover and/or scalability strategies. The cloud service system 112 handles routing of requests to instances of the secure Cloud proxy service 160, so the secure cloud proxy service 160 has interfaces such as the proxy API 170 to allow for various configurations to the network paths to one or more instances of the secure Cloud proxy service 160. For example, the proxy API 170 may typically be invoked using internet protocols such as REST over HTTP, described by a URL. Rather than a providing a single URL to be invoked, there may be a set of redundant URLs that may be used for automatic failover in the event that one instance of the proxy API 170 is not responding. Alternatively, there may be an intermediary service that routes the requests to appropriate instances using a load balancing technique.

In a typical implementation, the secure Cloud proxy service and the adaptors will not retain operational state between invocations. For example, all the information required to complete the required operations is provided by the parameters of each invocation, or may be retrieved from some other storage. This is the best practice avoid the requirement of multiple instances of a proxy service to communicate with each other and is a well-known technique for improving scalability.

Figure 4:
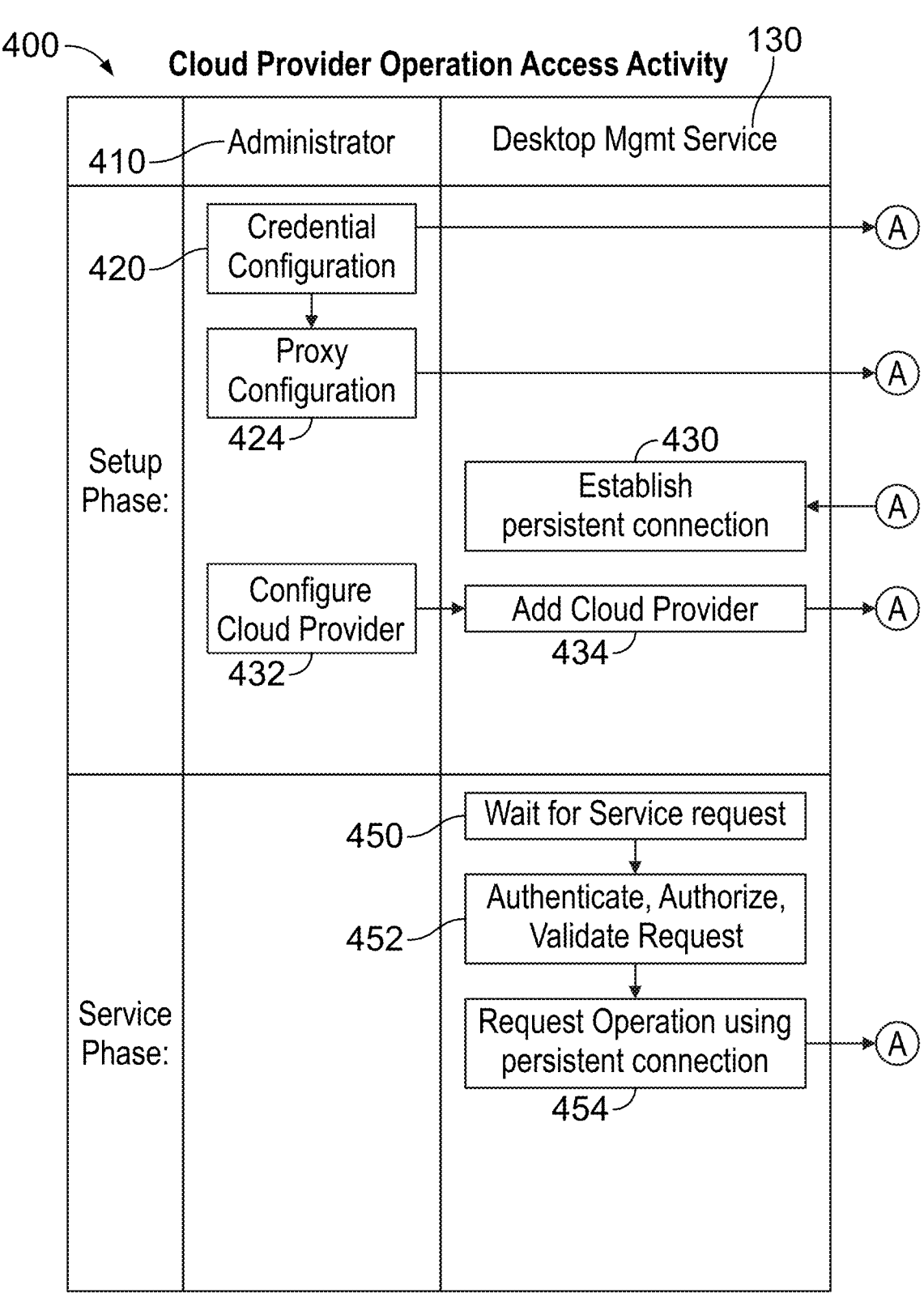
FIG. 4 is a process diagram of exchanging security information with the example proxy for providing a remote application in the system in FIG. 2.
Figure 4:
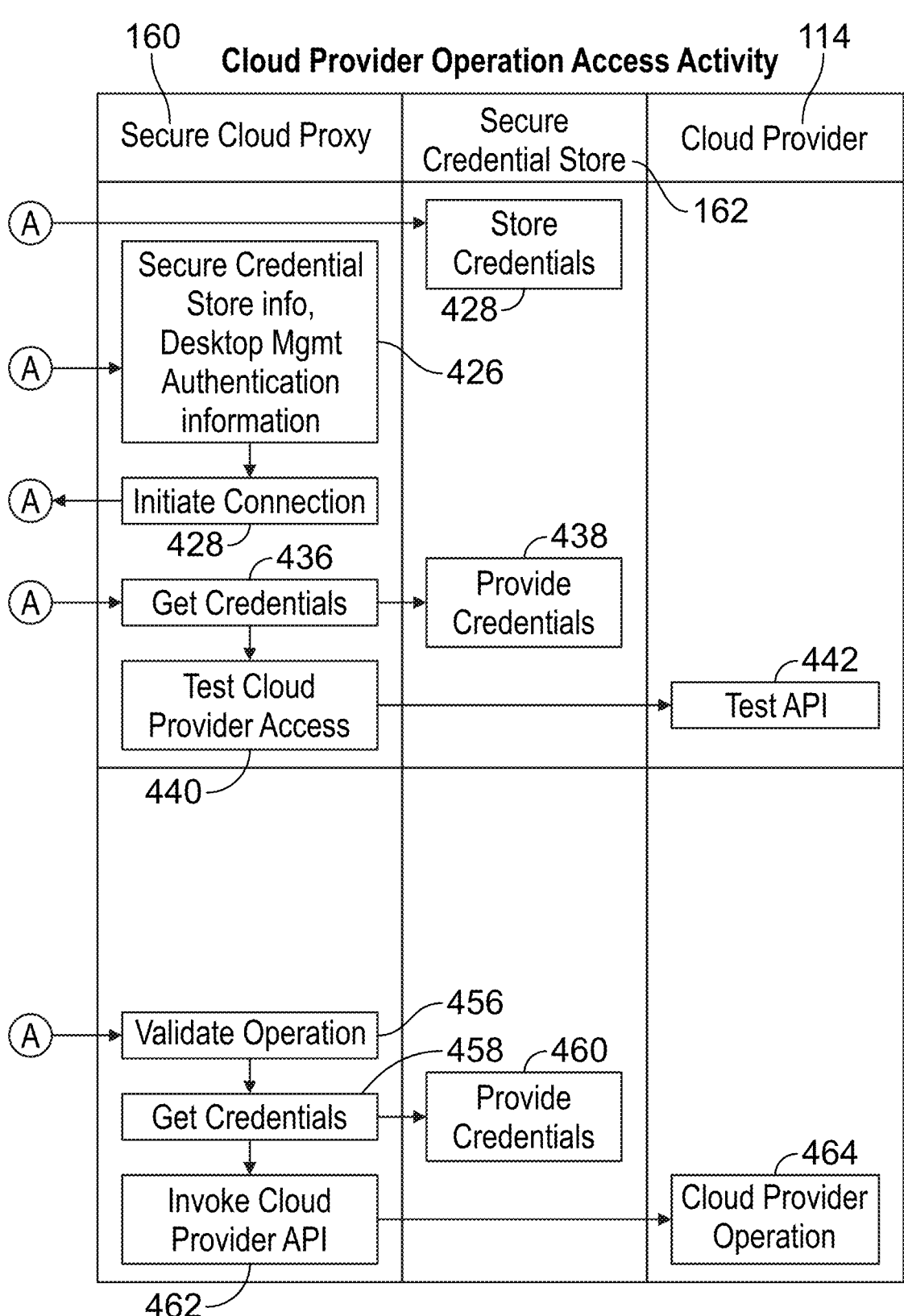

FIG. 4 shows an example process diagram 400 illustrating one embodiment of a desktop management service 130 accessing a Cloud provider API such as the Cloud provider API 124 in the system 100 in FIG. 2. The process diagram 400 shows activities across five actors, an administrator 410, the desktop management service 130 of the desktop service system 112, the secure Cloud proxy service 160, the secure credential store 162, and the Cloud provider system 114. The process occurs in two phases, a setup phase and a service phase. The setup phase is the time when an IT administrator such as the administrator 410 installs and configures the secure Cloud proxy service 160 for future use by the desktop management service 130. The service phase is the time when Cloud provider operations are required by the desktop service system 112. These operations may be required for various use cases such as when a Cloud desktop must be provisioned or deprovisioned, performing a Cloud desktop status check, performing a status change (for example, pausing and resuming a Cloud desktop), or other changes to a Cloud desktop virtual machine.

During the setup phase, the administrator 410 performs credential configuration (420) by storing Cloud provider access credentials in the secure credential store 162 (422). The IT administrator 410 also performs secure Cloud proxy configuration (424) by providing the secure proxy service 160 access information 426 about the secure credential store 162, and authentication information, such as an integration key, to connect to the desktop management service 130. This authentication information is stored securely within the security environment of the secure cloud proxy.

The secure Cloud proxy service 160 initiates a secure connection to the desktop management service 130 (428) using the configured credentials to access the security environment of the desktop service system 112. Together the secure Cloud proxy service 160 and the desktop management service 130 creates and maintains a persistent connection (430). A "persistent" connection is one that is maintained even if either party to the connection is restarted. The setup phase is thus complete once the persistent connection is established.

At some later time in this setup phase, the desktop management service administrator (typically this may be a different role than the IT administrator) configures a new cloud provider (432) using any relevant cloud subscription account information, that is registered with the desktop management service 130 in an add cloud provider operation (434). The Cloud proxy service 160 first retrieves Cloud provider credentials from the secure credential store 162 (436). In response the retrieval request, the secure credential store 162 provides the credentials for the Cloud provider system 114 (438). As part of this operation, the desktop management service 130 invokes a test to the Cloud provider system 114 by invoking this operation on the secure cloud proxy 160.

The secure Cloud proxy service 160 in turn tests access to the Cloud provider system 114. The proxy service 160 then invokes a test Cloud Provider API call (440) using the Cloud provider API adaptor 164. The test call will typically be a service operation without side effects, such as retrieving status of the virtual machines existing in the Cloud subscription account. The Cloud provider API adaptor 164 requests the operational test of the API 124 by the Cloud provider system 114 and the Cloud provider system 114 tests the API 124 using the service operation (442).

On a successful Cloud provider operation test, the Cloud provider 114 confirms that the secure Cloud proxy service 160 is ready to be used. The setup phase is thus complete once the persistent connection is established.

In the service phase, various use cases may trigger the need for a Cloud provider operation to be performed, as described above. The desktop management service waits for such a request (450). A request for a Cloud provider operation may originate from any component of the desktop service control plane, desktop client 116, or the desktop management service 130. For example, the desktop management service 130 may periodically check the idle time of a Cloud desktop and may put the desktop into a paused state to conserve computing resources.

If the request arises from an external component, the desktop management service 130 determines the component invoking the request is authenticated and authorized within the security environment of the desktop service system 112 and otherwise validates the request (452). Once the request is validated, the desktop management service 130 determines that a Cloud provider operation is required, and formulates a request (454) to the interface to the secure Cloud proxy service 160 using the persistent connection established during the setup phase. This request could be an abstracted API interface of the secure Cloud proxy service 160, or it could be a simple facade of the Cloud provider API 124, or any combination of these two approaches.

The secure Cloud proxy service 160 receives the request through the interface, and validates that the request is valid, and allowed within its planned scope of operation within the customer-managed secure Cloud proxy security environment (456). The secure Cloud proxy service 160 makes a request for credentials as needed to the secure credential store 162 (458). The secure credential store 162 provides the requested credentials in response to the request (460). Thus, the proxy service 160 does not store the credentials itself. The proxy service 160 always gets the credentials "just in time" from the secure credential store 162. This keeps the credentials more secure. In security parlance, the credentials are never "at rest" except in the secure credential store 162. The secure Cloud proxy service 160 translates the request into a specific cloud provider API request using the specific cloud provider API adaptor 164 (462). The API request is received, and the Cloud provider system 114 performs the requested operation (464). Thus, the secure Cloud proxy service 160 validates and executes the request within the cloud provider security environment.

The example secure Cloud proxy service system 110 removes the previous requirement that the customer of a Cloud provider system 114 must share API credentials of the Cloud provider with the Cloud desktop service system 112. The example system, through the secure Cloud proxy service system 110 reduces exposure of credentials and other confidential data beyond the Cloud provider 114 or the secure credential store 162. As the desktop service system 112 is often a third party service outside the organizational control of the customer, the ability to preserve the confidential information by the secure Cloud proxy service system 110 reduces the need for trust across components (sometimes called a "zero-trust strategy") in a manner that is generally perceived to reduce the possibility of security attacks.

The customer of the cloud provider system 114 can change API credentials at any time without interacting with the cloud desktop service system 112, adding to operational simplicity. The customer through the example secure Cloud proxy system 110 may also revoke access to the cloud desktop service system 112 at any time by stopping the operation of the secure Cloud proxy service system 110.

The cloud desktop service system 112 retains the ability to fully orchestrate the components of the Cloud provider system 114 that support the virtual desktop and other virtual applications. This includes ensuring that resources are correctly provisioned, initialized, and registered so that monitoring and orchestration features that do not require the desktop service system to access the API credentials can still function.

The example method using the proxy service system 110 is a simple way of restricting what the cloud desktop service system 112 may do, without requiring the cloud desktop service system security environment to be opened to the customer, or alternatively having to give the desktop service system 112 more trust than is needed for the desktop service system to function.

The example method provides an elegant separation of security addressing the concerns of orchestration and secure access to the resources of a cloud provider. Since the Cloud provider APIs are encapsulated within the example secure Cloud proxy service 110, the customer may extend the cloud desktop service system 112 to support other providers by providing a plug-in to the proxy. The providers may include new cloud provider services or private datacenters. The providers may provide a bridge to any other virtual machine virtualization services either presently or offered in the future.

Figure 5:
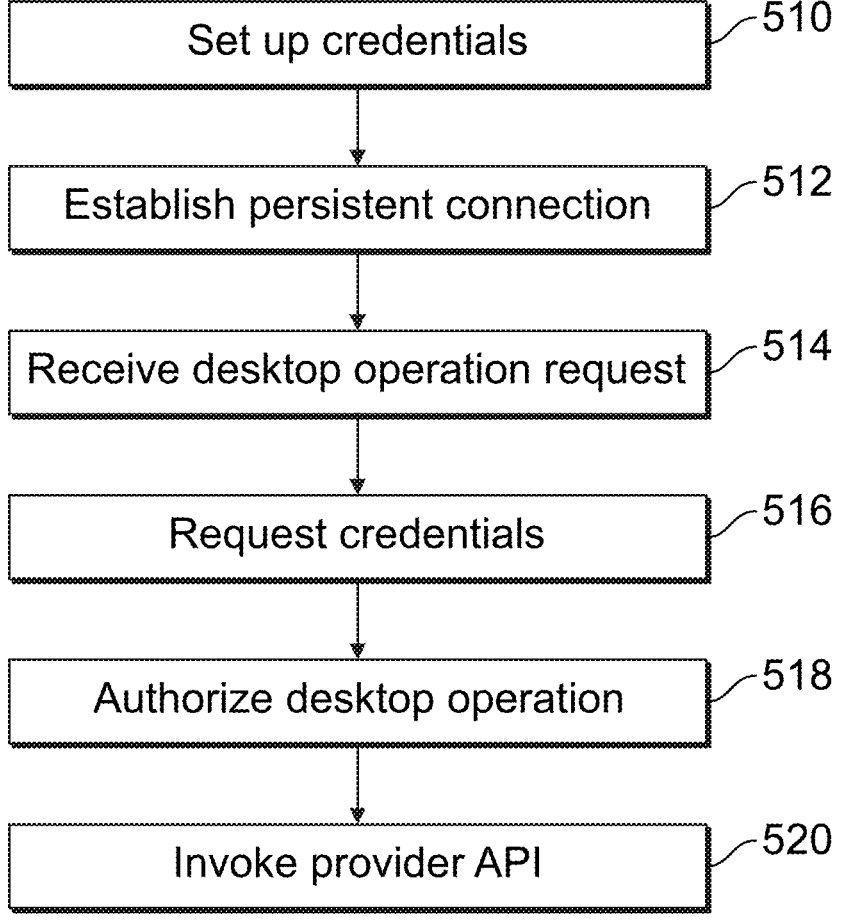
FIG. 5 is a flow diagram of a routine executed by the example Cloud proxy to protect credential information to access the Cloud provider from the desktop service provider.

FIG. 5 is a flow diagram of a routine to operate a Cloud proxy service for security between a desktop service and a Cloud provider. In this example, the machine readable instructions comprise an algorithm for execution by: (a) a processor, (b) a controller, and/or (c) one or more other suitable processing device(s). The algorithm may be embodied in software stored on tangible media such as flash memory, CD-ROM, floppy disk, hard drive, digital video (versatile) disk (DVD), or other memory devices. However, persons of ordinary skill in the art will readily appreciate that the entire algorithm and/or parts thereof can alternatively be executed by a device other than a processor and/or embodied in firmware or dedicated hardware in a well-known manner (e.g., it may be implemented by an application specific integrated circuit [ASIC], a programmable logic device [PLD], a field programmable logic device [FPLD], a field programmable gate array [FPGA], discrete logic, etc.). For example, any or all of the components of the interfaces can be implemented by software, hardware, and/or firmware. Also, some or all of the machine readable instructions represented by the flowcharts may be implemented manually. Further, although the example algorithm is described with reference to the flowcharts illustrated in FIG. 9, persons of ordinary skill in the art will readily appreciate that many other methods of implementing the example machine readable instructions may alternatively be used. For example, the order of execution of the blocks may be changed, and/or some of the blocks described may be changed, eliminated, or combined.

The routine first sets up the credentials and ensures the credentials are stored and the connection to the Cloud provider through the API is operational (510). The routine then establishes a persistent connection with the desktop management system. (512). The routine receives an operational request from the desktop management system (514). The routine retrieves the credentials from the credential store and provides the credential to the Cloud provider API through the API adaptor (516). The routine then receives an authorization for the requested operation (518). The routine then invokes the Cloud provider API through the API adaptor (520).

Figures 6, 7:
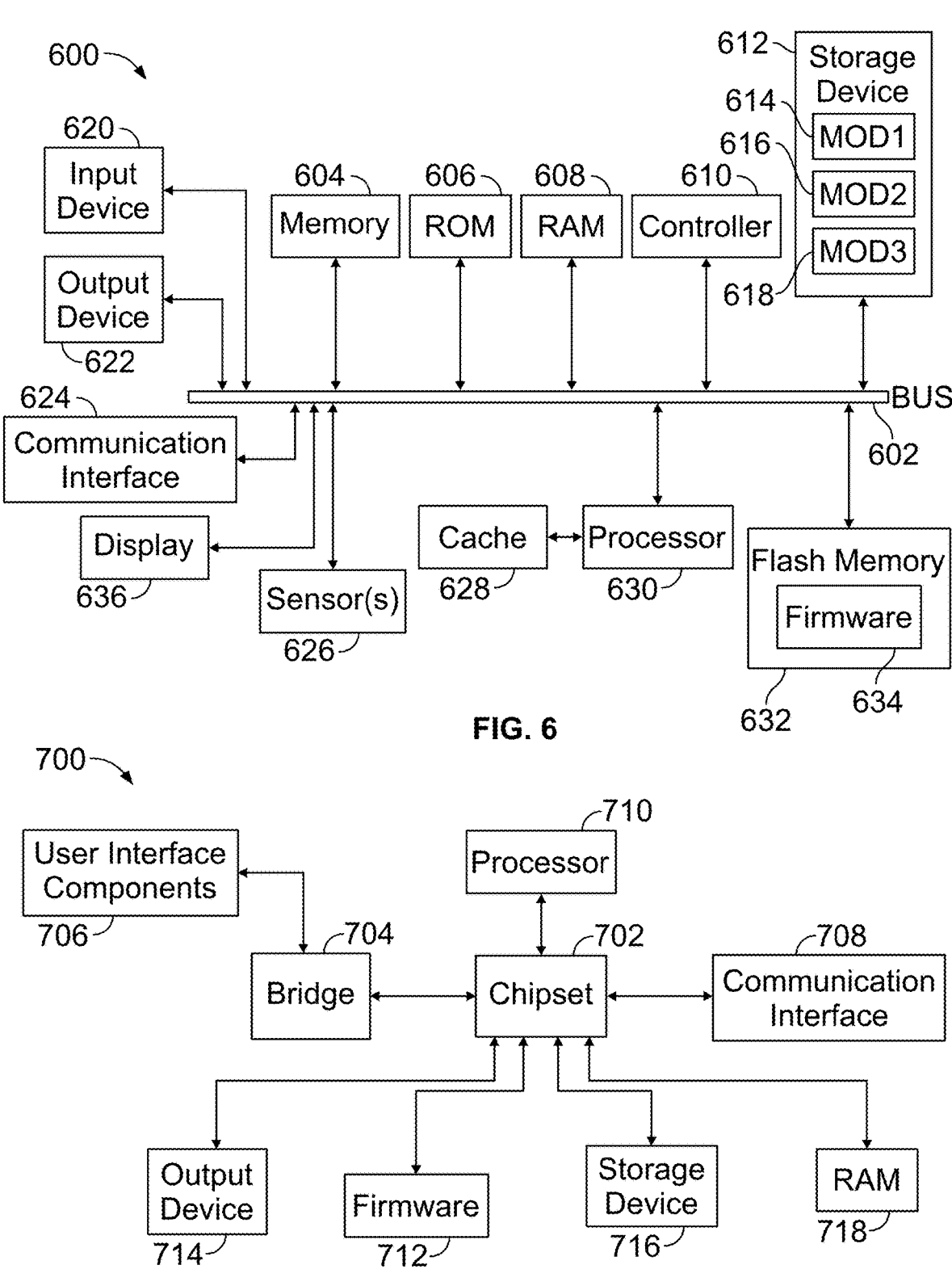
FIGS. 6 and 7 illustrate exemplary systems in accordance with various examples of the present disclosure.

FIGS. 6-7 illustrate an example computing system 600, in which the components of the computing system are in electrical communication with each other using a bus 602. The system 600 includes a processing unit (CPU or processor) 630 and a system bus 602 that couple various system components, including the system memory 604 (e.g., read only memory (ROM) 606 and random access memory (RAM) 608), to the processor 630. The system 600 can include a cache of high-speed memory connected directly with, in close proximity to, or integrated as part of the processor 630. The system 600 can copy data from the memory 604 and/or the storage device 612 to the cache 628 for quick access by the processor 630. In this way, the cache can provide a performance boost for processor 630 while waiting for data. These and other modules can control or be configured to control the processor 630 to perform various actions. Other system memory 604 may be available for use as well. The memory 604 can include multiple different types of memory with different performance characteristics. The processor 630 can include any general purpose processor and a hardware module or software module, such as module 1 614, module 2 616, and module 3 618 embedded in storage device 612. The hardware module or software module is configured to control the processor 630, as well as a special-purpose processor where software instructions are incorporated into the actual processor design. The processor 630 may essentially be a completely self-contained computing system that contains multiple cores or processors, a bus, memory controller, cache, etc. A multi-core processor may be symmetric or asymmetric.

To enable user interaction with the computing device 600, an input device 620 is provided as an input mechanism. The input device 620 can comprise a microphone for speech, a touch-sensitive screen for gesture or graphical input, keyboard, mouse, motion input, and so forth. In some instances, multimodal systems can enable a user to provide multiple types of input to communicate with the system 600. In this example, an output device 622 is also provided. The communications interface 624 can govern and manage the user input and system output.

Storage device 612 can be a non-volatile memory to store data that is accessible by a computer. The storage device 612 can be magnetic cassettes, flash memory cards, solid state memory devices, digital versatile disks, cartridges, random access memories (RAMs) 608, read only memory (ROM) 606, and hybrids thereof.

The controller 610 can be a specialized microcontroller or processor on the system 600, such as a BMC (baseboard management controller). In some cases, the controller 610 can be part of an Intelligent Platform Management Interface (IPMI). Moreover, in some cases, the controller 610 can be embedded on a motherboard or main circuit board of the system 600. The controller 610 can manage the interface between system management software and platform hardware. The controller 610 can also communicate with various system devices and components (internal and/or external), such as controllers or peripheral components, as further described below.

The controller 610 can generate specific responses to notifications, alerts, and/or events, and communicate with remote devices or components (e.g., electronic mail message, network message, etc.) to generate an instruction or command for automatic hardware recovery procedures, etc. An administrator can also remotely communicate with the controller 610 to initiate or conduct specific hardware recovery procedures or operations, as further described below.

The controller 610 can also include a system event log controller and/or storage for managing and maintaining events, alerts, and notifications received by the controller 610. For example, the controller 610 or a system event log controller can receive alerts or notifications from one or more devices and components, and maintain the alerts or notifications in a system event log storage component.

Flash memory 632 can be an electronic non-volatile computer storage medium or chip that can be used by the system 600 for storage and/or data transfer. The flash memory 632 can be electrically erased and/or reprogrammed. Flash memory 632 can include EPROM (erasable programmable read-only memory), EEPROM (electrically erasable programmable read-only memory), ROM, NVRAM, or CMOS (complementary metal-oxide semiconductor), for example. The flash memory 632 can store the firmware 634 executed by the system 600 when the system 600 is first powered on, along with a set of configurations specified for the firmware 634. The flash memory 632 can also store configurations used by the firmware 634.

The firmware 634 can include a Basic Input/Output System or equivalents, such as an EFI (Extensible Firmware Interface) or UEFI (Unified Extensible Firmware Interface). The firmware 634 can be loaded and executed as a sequence program each time the system 600 is started. The firmware 2034 can recognize, initialize, and test hardware present in the system 600 based on the set of configurations. The firmware 634 can perform a self-test, such as a POST (Power-On-Self-Test), on the system 600. This self-test can test the functionality of various hardware components such as hard disk drives, optical reading devices, cooling devices, memory modules, expansion cards, and the like. The firmware 634 can address and allocate an area in the memory 604, ROM 606, RAM 608, and/or storage device 612, to store an operating system (OS). The firmware 634 can load a boot loader and/or OS, and give control of the system 600 to the OS.

The firmware 634 of the system 600 can include a firmware configuration that defines how the firmware 634 controls various hardware components in the system 600. The firmware configuration can determine the order in which the various hardware components in the system 600 are started. The firmware 634 can provide an interface, such as an UEFI, that allows a variety of different parameters to be set, which can be different from parameters in a firmware default configuration. For example, a user (e.g., an administrator) can use the firmware 634 to specify clock and bus speeds, define what peripherals are attached to the system 600, set monitoring of health (e.g., fan speeds and CPU temperature limits), and/or provide a variety of other parameters that affect overall performance and power usage of the system 600. While firmware 634 is illustrated as being stored in the flash memory 632, one of ordinary skill in the art will readily recognize that the firmware 634 can be stored in other memory components, such as memory 604 or ROM 606.

System 600 can include one or more sensors 626. The one or more sensors 626 can include, for example, one or more temperature sensors, thermal sensors, oxygen sensors, chemical sensors, noise sensors, heat sensors, current sensors, voltage detectors, air flow sensors, flow sensors, infrared thermometers, heat flux sensors, thermometers, pyrometers, etc. The one or more sensors 626 can communicate with the processor, cache 628, flash memory 632, communications interface 624, memory 604, ROM 606, RAM 608, controller 610, and storage device 612, via the bus 602, for example. The one or more sensors 626 can also communicate with other components in the system via one or more different means, such as inter-integrated circuit (I2C), general purpose output (GPO), and the like. Different types of sensors (e.g., sensors 626) on the system 600 can also report to the controller 610 on parameters, such as cooling fan speeds, power status, operating system (OS) status, hardware status, and so forth. A display 636 may be used by the system 600 to provide graphics related to the applications that are executed by the controller 610.

FIG. 7 illustrates an example computer system 700 having a chipset architecture that can be used in executing the described method(s) or operations, and generating and displaying a graphical user interface (GUI). Computer system 700 can include computer hardware, software, and firmware that can be used to implement the disclosed technology. System 700 can include a processor 710, representative of a variety of physically and/or logically distinct resources capable of executing software, firmware, and hardware configured to perform identified computations. Processor 710 can communicate with a chipset 702 that can control input to and output from processor 710. In this example, chipset 702 outputs information to output device 714, such as a display, and can read and write information to storage device 716. The storage device 716 can include magnetic media, and solid state media, for example. Chipset 702 can also read data from and write data to RAM 718. A bridge 704 for interfacing with a variety of user interface components 706, can be provided for interfacing with chipset 702. User interface components 706 can include a keyboard, a microphone, touch detection, and processing circuitry, and a pointing device, such as a mouse.

Chipset 702 can also interface with one or more communication interfaces 708 that can have different physical interfaces. Such communication interfaces can include interfaces for wired and wireless local area networks, for broadband wireless networks, and for personal area networks. Further, the machine can receive inputs from a user via user interface components 706, and execute appropriate functions, such as browsing functions by interpreting these inputs using processor 710.

Moreover, chipset 702 can also communicate with firmware 712, which can be executed by the computer system 700 when powering on. The firmware 712 can recognize, initialize, and test hardware present in the computer system 700 based on a set of firmware configurations. The firmware 712 can perform a self-test, such as a POST, on the system 700. The self-test can test the functionality of the various hardware components 702-718. The firmware 712 can address and allocate an area in the memory 718 to store an OS. The firmware 712 can load a boot loader and/or OS, and give control of the system 700 to the OS. In some cases, the firmware 712 can communicate with the hardware components 702-710 and 714-718. Here, the firmware 712 can communicate with the hardware components 702-710 and 714-718 through the chipset 702, and/or through one or more other components. In some cases, the firmware 712 can communicate directly with the hardware components 702-710 and 714-718.

It can be appreciated that example systems 600 (in FIG. 6) and 700 can have more than one processor (e.g., 630, 710), or be part of a group or cluster of computing devices networked together to provide greater processing capability.

As used in this application, the terms "component," "module," "system," or the like, generally refer to a computer-related entity, either hardware (e.g., a circuit), a combination of hardware and software, software, or an entity related to an operational machine with one or more specific functionalities. For example, a component may be, but is not limited to being, a process running on a processor (e.g., digital signal processor), a processor, an object, an executable, a thread of execution, a program, and/or a computer. By way of illustration, both an application running on a controller, as well as the controller, can be a component. One or more components may reside within a process and/or thread of execution, and a component may be localized on one computer and/or distributed between two or more computers. Further, a "device" can come in the form of specially designed hardware, generalized hardware made specialized by the execution of software thereon that enables the hardware to perform specific function, software stored on a computer-readable medium, or a combination thereof.

The terminology used herein is for the purpose of describing particular embodiments only, and is not intended to be limiting of the invention. As used herein, the singular forms "a," "an," and "the" are intended to include the plural forms as well, unless the context clearly indicates otherwise. Furthermore, to the extent that the terms "including," "includes," "having," "has," "with," or variants thereof, are used in either the detailed description and/or the claims, such terms are intended to be inclusive in a manner similar to the term "comprising."

Unless otherwise defined, all terms (including technical and scientific terms) used herein have the same meaning as commonly understood by one of ordinary skill in the art. Furthermore, terms, such as those defined in commonly used dictionaries, should be interpreted as having a meaning that is consistent with their meaning in the context of the relevant art, and will not be interpreted in an idealized or overly formal sense unless expressly so defined herein.

While various embodiments of the present invention have been described above, it should be understood that they have been presented by way of example only, and not limitation. Although the invention has been illustrated and described with respect to one or more implementations, equivalent alterations and modifications will occur or be known to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application. Thus, the breadth and scope of the present invention should not be limited by any of the above described embodiments. Rather, the scope of the invention should be defined in accordance with the following claims and their equivalents.

What is claimed is:

1. A system providing Cloud applications comprising:
a client application executed by a user device;
a Cloud provider system including a first processor providing network communication between the user device and a virtual machine executing a virtual application, the Cloud provider system including a Cloud provider application programming interface (API);
a desktop service system including a second processor in network communication with the user device and the Cloud provider system; and
a secure Cloud proxy service system interposed between the Cloud provider API and the desktop service system, the secure Cloud proxy service system protected by a security environment, and including a third processor executing a secure Cloud proxy service, a credential storage storing credentials for the Cloud provider API, and an API adaptor to communicate with the Cloud provider API, wherein the secure Cloud proxy service system initiates a persistent connection with the desktop service system where the persistent connection with the desktop service system is maintained when either or the desktop service system and the Cloud proxy service system restarts, and controls communication between the desktop service system and the Cloud provider system to prevent computing devices outside the Cloud provider system from directly accessing the virtual machine.

2. The system of claim 1, wherein the API adaptor is a plug-in customized by the owner of the secure Cloud proxy service system.

3. The system of claim 1, wherein the secure Cloud proxy service system includes a library of API adaptors specific to different Cloud provider systems, wherein the API adaptor is one of the API adaptors in the library.

4. The system of claim 1, wherein the secure Cloud proxy service system includes a proxy application programming interface (API) allowing control of operations of the desktop management service system in managing operations of the Cloud provider system.

5. The system of claim 4, wherein a proxy application programming interface operation is implemented by one of a single corresponding cloud provider operation, a sequence of intermediate cloud provider operations, or a batch of repeated cloud provider operations.

6. The system of claim 4, wherein the proxy application programming interface returns a partial status or an intermediate status while multiple intermediate cloud provider operations are occurring.

7. The system of claim 1, wherein the secure Cloud proxy service is operable to allow configurations of network paths to multiple instances of the Cloud proxy service for high availability.

8. The system of claim 1, wherein the credential store is one of a secure encrypted key vault, an encrypted file, a database, or a memory of the secure Cloud proxy service system.

9. The system of claim 1, wherein the secure Cloud proxy service system controls operations of the desktop management service system associated with the virtual machine supported by the Cloud provider system.

10. The system of claim 1, wherein the secure Cloud proxy service only allows certain types of resources to be created by the desktop service system in the Cloud provider system.

11. A method for providing secure credentials for accessing a Cloud provider system that protects the secure credentials from a desktop management service system, the method comprising:

storing application programming interface (API) credentials in a credential store managed by a secure Cloud proxy service system protected by a security environment, wherein the secure Cloud proxy service system is interposed between the Cloud provider system and the desktop management service system;

receiving an operational request from the desktop service system;

retrieving an API credential from the credential store to authorize the operational request;

initiating a persistent connection with the desktop service system via the secure Cloud proxy service system where the persistent connection with the desktop service system is maintained when either or the desktop service system and the secure Cloud proxy service system restarts to prevent computing devices outside the Cloud provider system from directly accessing the virtual machine; and activating the API adaptor communicating with an API of the Cloud provider system to allow the Cloud provider to perform an operational request.

12. The method of claim 11, wherein the API adaptor is a plug-in customized by the owner of the secure Cloud proxy service system.

13. The method of claim 11, wherein the secure Cloud proxy service system includes a library of API adaptors specific to different Cloud provider systems, wherein the API adaptor is one of the API adaptors in the library.

14. The method of claim 11, further comprising allowing control of operations of the desktop management service system in managing operations of the Cloud provider system via a proxy application programming interface (API) of the secure Cloud proxy service system.

15. The method of claim 14, further comprising implementing a proxy application programming interface operation by one of: a single corresponding cloud provider operation, a sequence of intermediate cloud provider operations, or a batch of repeated cloud provider operations.

16. The method of claim 14, wherein the proxy application programming interface returns a partial status or an intermediate status while multiple intermediate cloud provider operations are occurring.

17. The method of claim 11, wherein the secure Cloud proxy service is operable to allow configurations of network paths to multiple instances of the Cloud proxy service for high availability.

18. The method of claim 11, wherein the credential store is one of a secure encrypted key vault, an encrypted file, a database, or a memory of the secure Cloud proxy service system.

19. The method of claim 11, wherein the secure Cloud proxy service system controls operations of the desktop management service system associated with the virtual machine supported by the Cloud provider system.

20. The method of claim 11, wherein the secure Cloud proxy service system only allows certain types of resources to be created by the desktop service system in the Cloud provider system.

21. A non-transitory computer-readable medium having machine-readable instructions stored thereon, which when executed by a processor, cause the processor to:

store application programming interface (API) credentials in a credential store managed by a secure Cloud proxy service system protected by a security environment and interposed between a Cloud provider system and a desktop management service system in network communication with a user device accessing the Cloud provider system;

receive an operational request from the desktop service system;

retrieve an API credential from the credential store to authorize the operational request;

initiate a persistent connection with the desktop service system via the secure Cloud proxy service system where the persistent connection with the desktop service system is maintained when either or the desktop service system and the secure Cloud proxy service system restarts to prevent computing devices outside the Cloud provider system from directly accessing the virtual machine; and activate the API adaptor communicating with an API of the Cloud provider system to allow the Cloud provider to perform an operational request.

\* \* \* \* \*